US009870000B2

(12) United States Patent
Stange

(10) Patent No.: US 9,870,000 B2
(45) Date of Patent: Jan. 16, 2018

(54) METHODS AND SYSTEMS FOR TRANSLATING AN EMERGENCY SYSTEM ALERT SIGNAL TO AN AUTOMATED FLIGHT SYSTEM MANEUVER

(75) Inventor: Kent Stange, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1008 days.

(21) Appl. No.: 13/073,627

(22) Filed: Mar. 28, 2011

(65) Prior Publication Data
US 2012/0253555 A1 Oct. 4, 2012

(51) Int. Cl.
G01C 23/00 (2006.01)
G05D 1/00 (2006.01)
G08G 5/00 (2006.01)
G05D 1/10 (2006.01)

(52) U.S. Cl.
CPC ........... *G05D 1/0055* (2013.01); *G05D 1/101* (2013.01); *G08G 5/0021* (2013.01); *G08G 5/0056* (2013.01)

(58) Field of Classification Search
USPC .......................................................... 701/3
See application file for complete search history.

(56) References Cited

U.S. PATENT DOCUMENTS 4,314,341 A 2/1982 Kivela
4,868,755 A * 9/1989 McNulty .............. G05D 1/0088
244/175
5,400,252 A * 3/1995 Kazimi ................ G05D 1/0883
244/169
6,739,556 B1 5/2004 Langston
7,098,810 B2 8/2006 Bateman et al.
(Continued)

FOREIGN PATENT DOCUMENTS

CN 1140494 A 1/1997
CN 1234575 A 11/1999
(Continued)

OTHER PUBLICATIONS

InterPilot, The Journal of the International Federation of Air Line Pilots' Associations; Airbus Extravaganza: A350 update, ROP/ROW & BTW & AP/FD TCAS reviewed; Fuel & Arimanship, Jul.-Aug. 2009.
(Continued)

Primary Examiner — Jean-Paul Cass
(74) Attorney, Agent, or Firm — Lorenz & Kopf, LLP

(57) ABSTRACT

Systems, methods and apparatus are provided for translating an alert signal into an auto flight system (AFS) maneuver. The system comprises a first module. The first module is configured to receive an alert signal and to construct one or more AFS mode commands associated with the alert signal. The system also comprises a second module. The second module is configured to read and to execute the one or more AFS mode commands that when executed manipulate two or more standard AFS modes that implement the AFS maneuver. The system further comprises a state machine, which couples the first module to the second module and is configured to coordinate the construction of the one or more AFS mode commands by the first module with an execution of the one or more AFS mode commands by the second module.

10 Claims, 6 Drawing Sheets

(56) References Cited

U.S. PATENT DOCUMENTS

| | | | |
|---|---|---|---|
| 7,142,971 B2 | 11/2006 | Brown et al. | |
| 7,295,134 B2 * | 11/2007 | Jourdan | G05D 1/0607 340/309.16 |
| 7,379,796 B2 | 5/2008 | Walsdorf et al. | |
| 7,479,925 B2 * | 1/2009 | Schell | G01S 13/9303 342/30 |
| 7,493,197 B2 * | 2/2009 | Bitar | G01C 21/20 342/29 |
| 7,589,646 B2 * | 9/2009 | Glover | G01C 21/005 340/963 |
| 7,633,410 B2 * | 12/2009 | Poe | G05D 1/0061 244/197 |
| 7,693,624 B2 | 4/2010 | Duggan et al. | |
| 7,725,215 B2 * | 5/2010 | Stange | B64C 13/503 244/194 |
| 7,840,316 B2 * | 11/2010 | Yount | B64C 13/503 244/194 |
| 7,874,521 B2 | 1/2011 | Shuster | |
| 7,890,248 B2 * | 2/2011 | Poe | G08G 5/0008 340/961 |
| 7,899,620 B2 * | 3/2011 | Jourdan | G01C 5/005 340/945 |
| 7,962,254 B2 * | 6/2011 | Bouchet | G01C 23/00 340/977 |
| 7,971,095 B2 * | 6/2011 | Hess | G06F 11/1438 714/15 |
| 7,991,491 B2 * | 8/2011 | Flemisch | G05B 7/02 700/11 |
| 8,046,119 B2 * | 10/2011 | Bitar | G01C 21/20 340/971 |
| 8,145,367 B2 * | 3/2012 | Khatwa | G08G 5/025 701/120 |
| 8,190,308 B2 * | 5/2012 | Pitard | G01O 5/005 244/175 |
| 2004/0215372 A1 * | 10/2004 | Bateman | G05D 1/0061 701/1 |
| 2005/0007257 A1 * | 1/2005 | Rast | B64D 47/04 340/815.45 |
| 2005/0098681 A1 * | 5/2005 | Berson | B64C 30/00 244/1 N |
| 2006/0167598 A1 | 7/2006 | Pennarola | |
| 2006/0284021 A1 * | 12/2006 | A'Harrah | B64C 13/10 244/195 |
| 2008/0046137 A1 | 2/2008 | Shue | |
| 2009/0152404 A1 * | 6/2009 | Yount | B64C 13/503 244/194 |
| 2012/0253555 A1 * | 10/2012 | Stange | G05D 1/0055 701/3 |
| 2016/0031564 A1 * | 2/2016 | Yates | B64D 33/00 307/9.1 |

FOREIGN PATENT DOCUMENTS

| | | |
|---|---|---|
| CN | 1592919 A | 3/2005 |
| DE | 102005055584 A | 8/2004 |
| GB | 2310184 A1 | 8/1997 |
| JP | 3557445 B2 | 8/2004 |

OTHER PUBLICATIONS

Botargues, P.; Airbus AP/FD TCAS Mode; A New Step Towards Safety Improvement, The Briefing Room—Learning from Experience, Jan. 2008.

Botargues, P.; Airbus New Auto Pilot/Flight Director TCAS mode; Enhancing flight safety during TCAS manoeuvres.

CN Office Action for Application No. 2012 10154503.5 dated Sep. 6, 2015.

CN Search Report for Application No. 2012 10154503.5 dated Aug. 21, 2015.

EP Search Report for application No. 12 161 135.4 dated Sep. 16, 2013.

EP Office Action for application No. 12 161 135.4 dated Sep. 27, 2013.

* cited by examiner

METHODS AND SYSTEMS FOR TRANSLATING AN EMERGENCY SYSTEM ALERT SIGNAL TO AN AUTOMATED FLIGHT SYSTEM MANEUVER

TECHNICAL FIELD

The present invention generally relates to Autoflight Systems ("AFS"), and more particularly relates to methods and systems for translating an emergency system alert signal into an AFS maneuver.

BACKGROUND

Various concepts for the avoidance of other aircraft, terrain, obstacles, and restricted areas have been discussed for a number of years. Some of these concepts include methods of assisted recovery or auto recovery from unusual flight situations. Still others create new and unique control systems or modes for existing control systems. However, few of these concepts have been implemented because of the technical challenges associated with flexibly coupling the autoflight systems ("AFS") to emergency warning/alerting systems ("Emergency Systems"). Examples of Emergency Systems include traffic collision avoidance systems (TCAS), wind shear detectors, and Enhanced Ground Proximity Systems (EGPWS). Examples of AFS include a flight director (FD), an autothrottle (AT) and an autopilot (AP) system.

One challenge in coupling Emergency Systems to an AFS is that most Emergency Systems today generate only a simple signal set that enunciates various undesirable conditions. The lack of signal sophistication can make it difficult to drive an AFS response to perform a comprehensive auto-avoidance maneuver. Another challenge is that avoidance maneuvers directed by different Emergency Systems can vary for a given warning. The context and the degree of definition for a given maneuver may vary as well.

Additionally, many standard AFS may not be equipped with means for receiving different types of signals and requests generated by the various deployed Emergency Systems. AFS are presently designed to accept commands via a mode control panel (MCP), a guidance panel (GP) or from a Flight Management System (FMS). The flight crew uses the MCP/GP/FMS to manually activate various conventional AFS modes pre-programmed into the AFS and to manually establish targets (i.e. reference values) for those modes. Similarly, the FMS activates pre-programmed AFS navigation modes within the AFS and establishes targets or references for those navigation modes.

The existing set of deployed AFS modes is large and expanding. A single commercial aircraft autopilot may have upwards of 25 thrust, lateral and vertical maneuvering modes. The pilot's increasingly burdensome task is to remember and correctly apply the rules for each AFS maneuvering mode to the flight situation in which he finds himself. A standard reference explaining AFS mode descriptions and AFS operation is RTCA DO-325 Minimum Operation Performance Standards (MOPS) for Automatic Flight Guidance and Control Systems and Equipment.

FIG. 1 is a simplified functional block diagram of a typical AFS 290 (i.e. an autopilot). Conventionally, mode selection and reference value setting is accomplished by the pilot 110 or by the FMS 111 via the MCP/GP 5. AFS mode selection determines which mode is initiated in the outer loop control sub-system 2 and which input from the aircraft sensors 4 are used for control feedback. The output from the outer loop control sub-system 2 controls the actual aircraft engine and control surface actuation 4 via the inner loop control sub-system 3. However, an AFS system 290 is currently not designed to receive mode input directly from Emergency Systems 100.

One solution to this problem entails creating one or more custom, pre-programmed AFS modes for a particular Emergency System that may be added to the list of outer loop modes. This approach has been used by Airbus SAS (headquartered in Toulouse, France) as explained in the Airbus documents "A New Step Towards Safety Improvement" and "Airbus New Autopilot/Flight Director TCAS Mode Enhancing Flight Safety During TCAS Maneuvers." However, this approach adds to the growing inventory of AFS modes required to be learned by the pilot and is limited to only the new modes customized for this purpose. Generic legacy modes still cannot be manipulated to implement maneuvers based on an alert from an Emergency System.

FIG. 2 is a simplified functional block diagram illustrating a conventional information flow that occurs in a conventional cockpit environment. Typically, all data inputs have been funneled through the pilot 110 to be acted upon by manually manipulating the aircraft flight and engine controls 150. The pilot utilizes these real-time data inputs from the Emergency Systems 100 as well as other information resources 140 such as visual acquisition, air traffic control communication, and the Airplane Flight Manual to aid in development of his response.

As is well known in the art, a TCAS 120 renders threat detection information to the pilot 110 both visually via a traffic display device 122 and aurally via aural alerts 124. A threat resolution advisory (RA) (i.e. an alert) is then provided to the pilot 110 via a threat resolution advisory display 126 (see FIG. 1) to instruct the pilot how to avoid the threat. The TCAS RA provides information that identifies the type of vertical maneuver to perform (e.g., "CLIMB," "DESCEND," "MAINTAIN," "ADJUST, etc.) and a vertical speed target value to either "fly to" or "avoid" depending on the type of vertical maneuver. Changes in the longitudinal and lateral axes are typically restricted, unless the changes are required to achieve the required vertical performance. The pilot 110 then makes a decision as to how to respond to the alerts received from the TCAS 120. The pilot may choose to ignore the alerts or to take action recommended by the threat RA or the aural alerts. Operation of an exemplary TCAS 120 is described in RTCA DO-185B entitled "Minimum Operational Performance Standards for Traffic Alert and Collision Avoidance System II (TCAS II)."

Similarly, the EGPWS 130 provides ground proximity warnings visually via a terrain display 132 and audibly via aural alerts 134. In either case, an EGPWS simply generates a single, discrete electrical signal that indicates a pull up maneuver is required. No further guidance is provided to the pilot 110 by the EGPWS 130 for a pull up maneuver that reflects what is typically included in Airplane Flight Manuals, such as: a) apply maximum thrust, b) roll wings level, and c) increase pitch attitude and climb at best available angle. The pilot may choose to ignore the alerts or to take action indicated by the alerts.

Accordingly, it is desirable to provide systems and methods for translating an alert received from the Emergency System 100 into an AFS maneuver. In addition, it is desirable to provide systems and methods for coupling Emergency Systems to an AFS using existing AFS modes. Furthermore, other desirable features and characteristics of the present invention will become apparent from the subsequent detailed description and the appended claims, taken in conjunction with the accompanying drawings and this background. Although today's sophisticated aircraft include other types of information sources 140 that may produce alerts, the following disclosure describes only a TCAS 120 and an EGPWS 130 for the sake of brevity and clarity.

BRIEF SUMMARY

A system is provided for translating an alert signal into an auto flight system (AFS) maneuver. The system comprises a first module. The first module is configured to receive the alert signal and to construct one or more AFS mode commands associated with the alert signal. The system also comprises a second module. The second module is configured to read and to execute the one or more AFS mode commands that when executed manipulate two or more standard AFS modes that implement the AFS maneuver. The system further comprises a state machine. The state machine couples the first module to the second module and is configured to coordinate the construction of the one or more AFS mode commands by the first module with an execution of the one or more AFS mode commands by the second module to control an engine and/or a flight control surface of the aircraft to effect the AFS maneuver.

A method is provided for translating an alert signal into a maneuver executed by an auto flight system (AFS). The method comprises receiving and validating the alert signal, creating one or more AFS mode commands based at least in part on the alert signal, and executing the one or more AFS mode commands, the one or more AFS mode commands being configured to manipulate two or more standard AFS modes as necessary to affect the maneuver.

An apparatus is provided for translating one or more alerts into an auto flight system (AFS) maneuver. The apparatus comprises a clock circuit and a processor. The processor contains a first module, a second module and a state machine and is configured to receive a time signal. The first module is configured to decode one or more alerts, validate the one or more alerts, determine a maneuver definition that is associated with the one or more alerts, and construct one or more AFS mode commands from the maneuver definition that when executed in combination direct the AFS to perform the AFS maneuver. The second module is configured to execute the one or more AFS mode commands determined from the maneuver definition by selectively arming one or more standard AFS modes required to implement the AFS maneuver. The apparatus further comprises a state machine coupling the first module to the second module, the state machine configured to coordinate the function of first module with that of the second module based on the time signal.

BRIEF DESCRIPTION OF THE DRAWINGS

The present invention will hereinafter be described in conjunction with the following drawing figures, wherein like numerals denote like elements.

DETAILED DESCRIPTION

Figure 1:
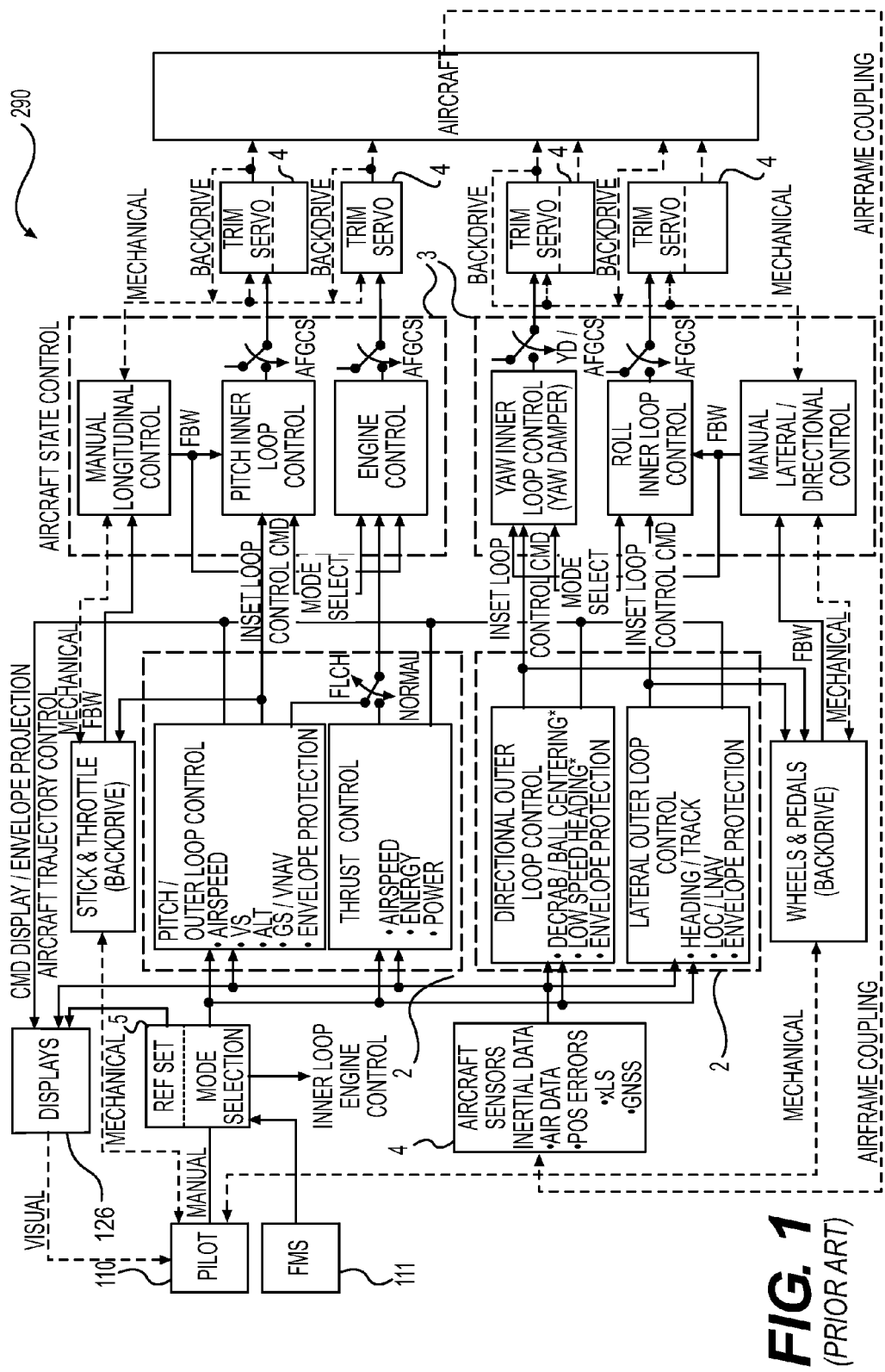
FIG. 1 is a simplified functional block diagram of a conventional AFS.
Figure 2:
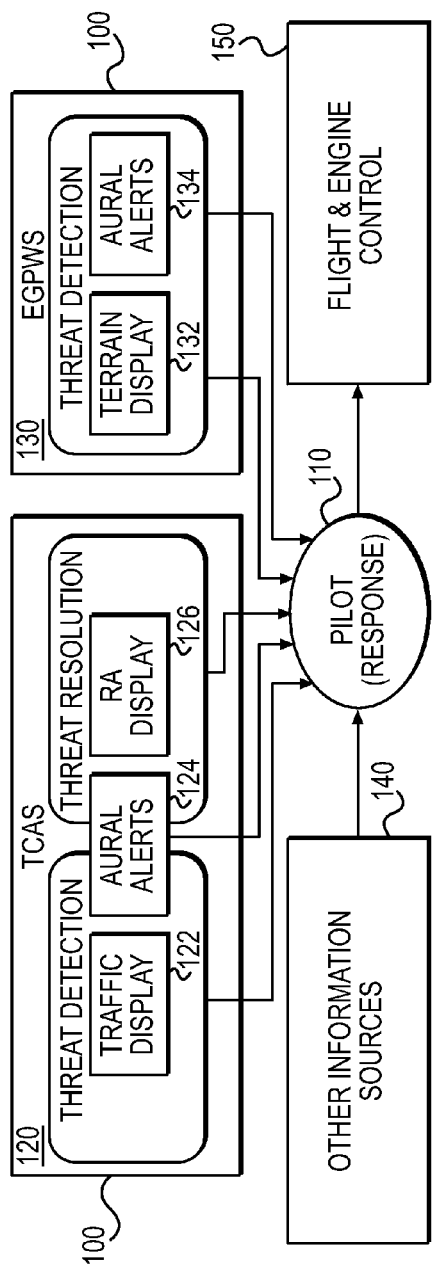
FIG. 2 is a simplified functional block diagram illustrating a conventional information flow that occurs in a cockpit environment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described below in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system, module or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements unless specifically so indicated. For example, two elements may be connected to each other physically, electronically, logically, or in any other manner, through one or more additional elements.

Figure 3:
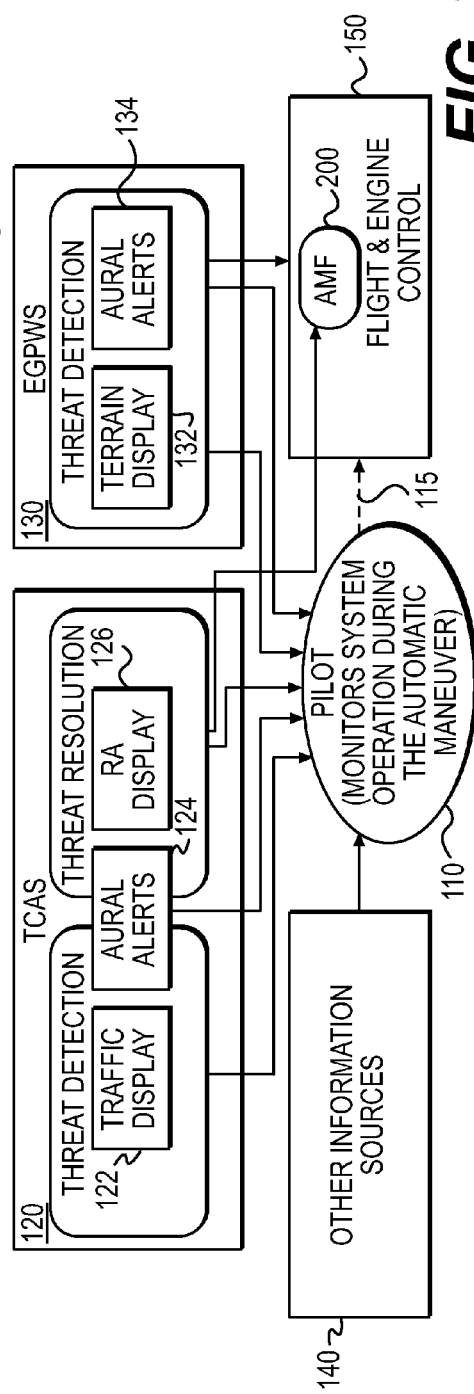
FIG. 3 is a simplified functional block diagram illustrating the information flow that occurs in cockpit environment according to embodiments.

FIG. 3 is a simplified functional block diagram illustrating the information flow that occurs in a cockpit environment according to embodiments disclosed herein. According to various features disclosed, an automated maneuver function (AMF) 200 receives RA's (i.e. alerts) from the TCAS 120, receives alert indications 134 from the EGPWS 130, and controls the engine and flight surfaces 150 based thereon. As a result, the pilot 110 may now monitor system operation during automatic maneuvers instead of executing manual control of the engine and flight surfaces 150. However, as always, the pilot 110 retains the ability to interrupt the automatic maneuver and pilot the aircraft manually 115 at any time. Those of ordinary skill in the art will appreciate that although only a TCAS 120 and an EGPWS 130 are discussed herein as examples. Other Emergency Systems may provide alert signals. Other non-limiting examples of Emergency Systems may include a cockpit intrusion alarm, a loss of cabin pressure or a loss of hydraulic pressure indication, just to name a few.

Figure 4:
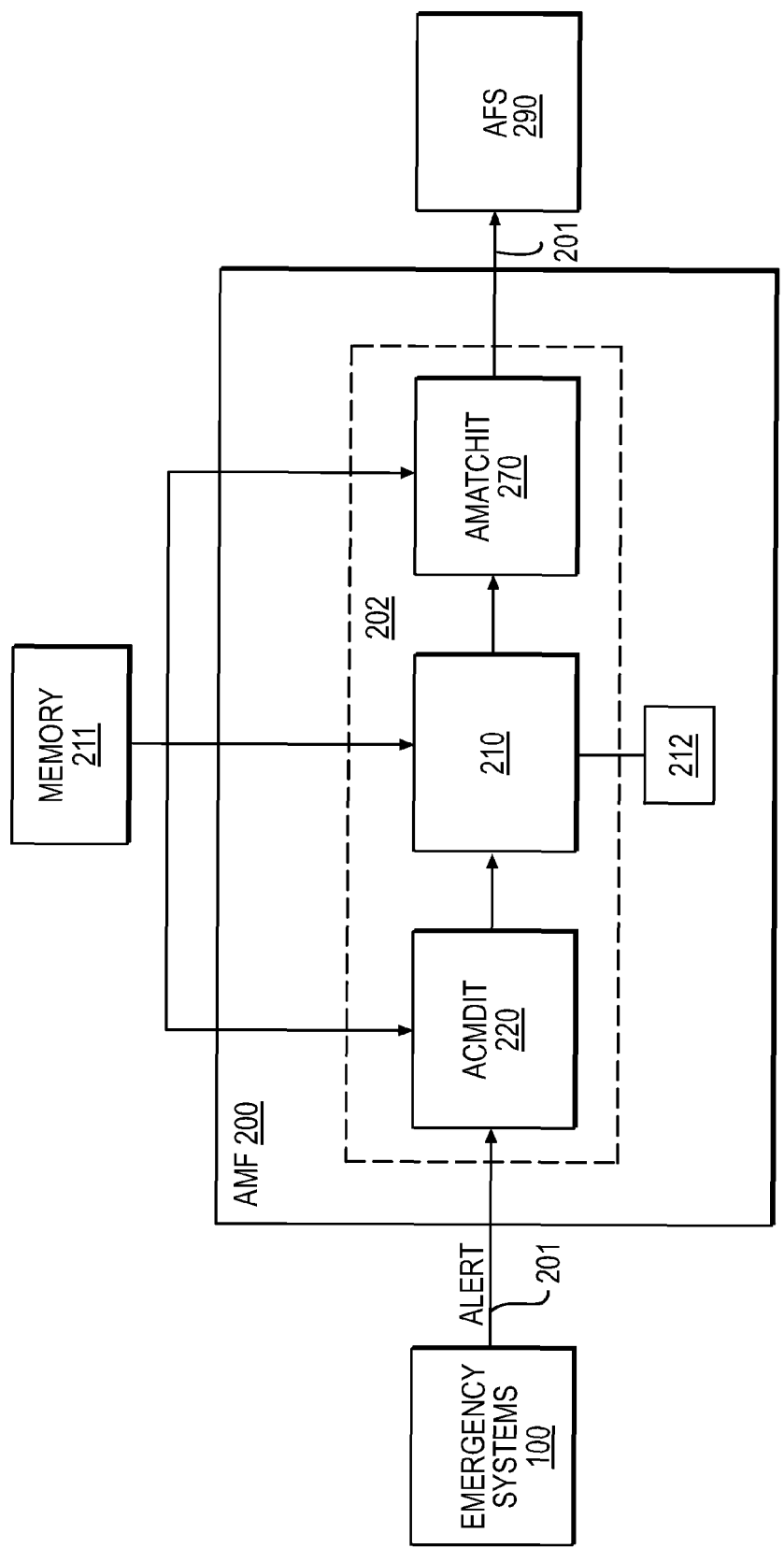
FIG. 4 is a functional block diagram of an automated maneuvering function (AMF) according to embodiments.

FIG. 4 is a functional block diagram of an AMF 200 as contemplated in various exemplary embodiments that are disclosed herein below. An AMF 200 may be embodied as a software object, as hardware, as firmware or a combination thereof without departing from the scope of the disclosure herein. In preferred embodiments, the AMF 200 is resident in the aircraft's AFS 290 but may alternatively reside in a memory 211, in an emergency system 100, or reside elsewhere in communication with the aircraft's data bus 201.

As used herein below, the term "automated flight system (AFS) maneuver" is defined to mean a list, or a script, of AFS understandable mode commands performed sequentially and associated target/reference value selections that enable a completely automated AFS maneuver to be performed by an AFS using existing AFS modes whenever a specific alert occurs. A script allows for the control of one or more applications running in the AFS 290 and is distinct from the core code of whatever application is running. In the context of the AMF 200, a script controls (i.e manipulates) one or more modes or submodes of an AFS 290.

The AMF 200 comprises an Autoflight Command Interpreter (ACMDIT) 220 and an Automatic Mode Activation, Check, and Interface (AMATCHIT) 270. The AMF 200 or any portion thereof may be executed by a processor 202. An ACMDIT 220 and/or an AMATCHIT 270 may be embodied as software, hardware, firmware or a combination therein.

The ACMDIT 220 is a module that is configured to provide a translational interface between an external command or an alert generated by an Emergency System 100 and the existing maneuvering modes of the AFS 290. Thus, the function of the ACMDIT 220 is to enable AFS maneuvers indicated by standard Emergency System to be performed by manipulating standard AFS automation modes. Thus, neither the reprogramming of an Emergency System nor the creation of new or special function modes or submodes of an AFS 290 is required to provide automated maneuver capability. The ACMDIT 220 also validates and prioritizes the Emergency System alerts before having them executed. For example, when multiple alerts are received at the same time, the ACMDIT 220 selects and translates the highest priority alert into commands understandable by the AFS 290 first.

In some embodiments, the ACMDIT 220 may translate a single EGPWS alert (e.g., pull up annunciation) into an AFS maneuver. Considering that most AFS maneuvers can largely be pre-defined in script form, the ACMDIT 220 provides for a large degree of flexibility when coupling Emergency Systems 100 that produce simple alerts to an existing AFS 290 requiring complex instructions. With the flexibility provided by the scripts, Emergency Systems 100 do not require specific knowledge of the AFS modes or their operation.

Besides auto-evasive maneuvers for TCAS and EGPWS alerts, other conceivable examples of AFS maneuvers that AMF 200 could provide include: automated emergency descent maneuver, automated wind shear maneuver, automated take off maneuver, an automated Air Traffic Control Uplink maneuver, an automated emergency landing maneuver or an automated maneuver that returns the aircraft to the initial flight condition existing prior to an emergency event.

In contrast to the ACMDIT 220, the AMATCHIT 270 executes the AFS maneuvers by interfacing with and manipulating the mode logic of the aircraft's deployed AFS 290 by activating/deactivating modes and targets/reference values specified by the ACMDIT 220. The AMATCHIT 270 may be configured to share many of the same mode logic inputs and references points as the existing cockpit MCP thereby minimizing changes required to the existing AFS mode logic and control laws. The AMATCHIT 270 may also be configured to apply a pre-defined set of limits, guards, or restrictions to the interpreted commands from the Emergency Systems 100 for each automated maneuver. These limits, guards, and restrictions ensure that each automated maneuver is restricted to only the modes, reference values, and performance limits that were initially defined to support the maneuver.

The interaction between the ACMDIT 220 and the AMATCHIT 270 is controlled by one or more state machines 210. A state machine is a software object composed of a finite number of states, specified transitions between those states, and actions occurring at those states, such as generating a specific output based on a specific input.

Figure 5:
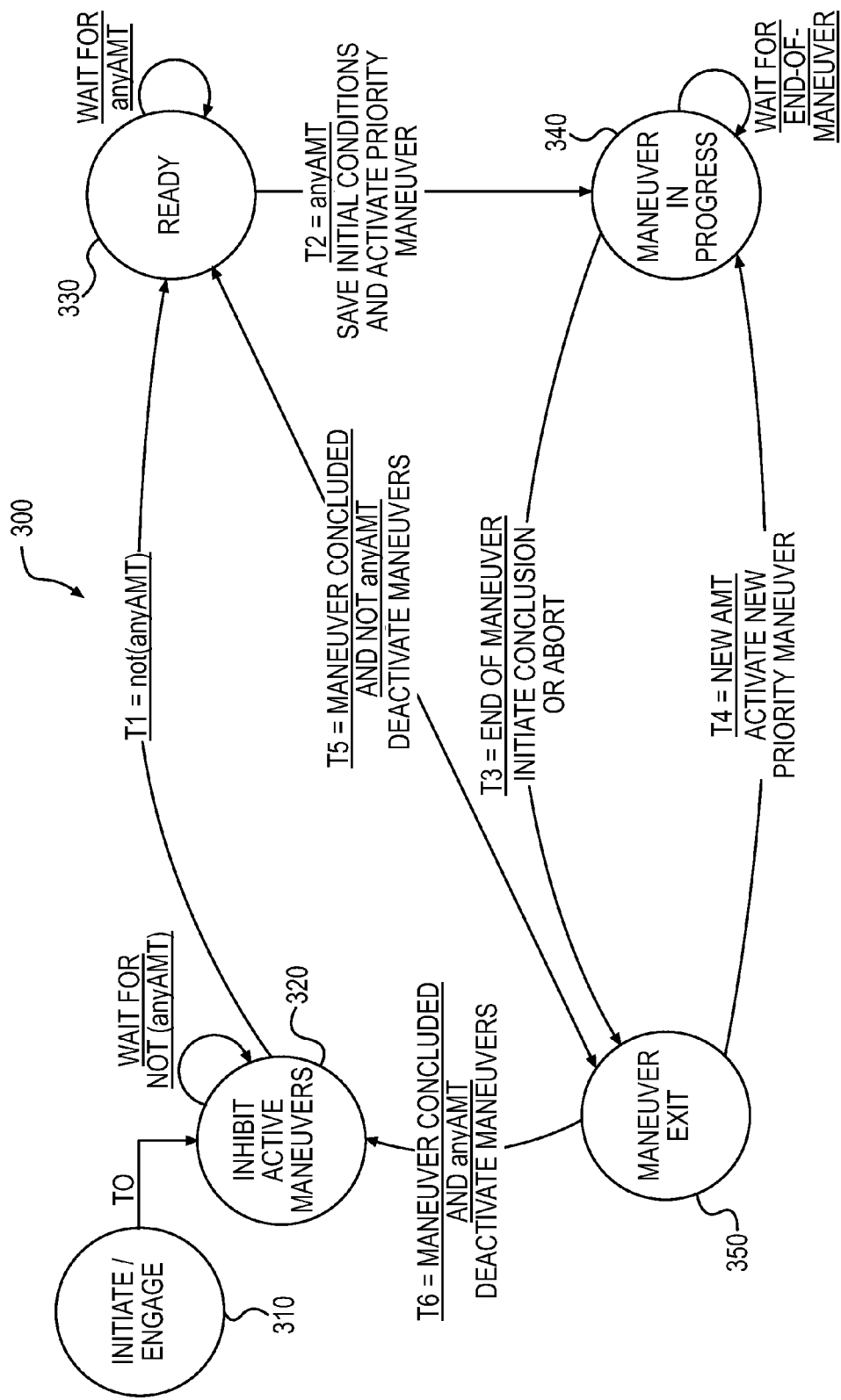
FIG. 5 is a state diagram for an exemplary state machine that may used to interface with the Autoflight Command Interpreter (ACMDIT) and the Automatic Mode Activation Check and Interface (AMATCHIT) according to embodiments.

FIG. 5 is a state diagram 300 for an exemplary state machine 210 that may used to interface with the ACMDIT 220 and the AMATCHIT 270 according to embodiments disclosed herein. The exemplary state machine 210 may have four states: Inhibit Active Maneuvers State 320, Ready State 330, Maneuver in Progress State 340 and Maneuver Exit State 350. Those of ordinary skill in the art will appreciate that the four states listed above are only exemplary. States may be combined into fewer states, states may be broken down into smaller or different states and tasks may be reassigned amongst the various states without departing for the scope of the disclosure herein.

At process 310, the state machine 210 is initiated when the AMF 200 is engaged by the pilot manually or it is engaged during aircraft start up procedures to the Inhibit Active Maneuvers state 320. At Inhibit Active Maneuvers state 320, the state machine inhibits all automated maneuvers and waits until all automated maneuver triggers (AMT) (i.e. alerts) are cleared. This ensures that any AMTs that may have been spuriously detected due to the initialization or that are residual from any previous maneuvers that were already triggered will not be acted upon. Once all alerts have been cleared, the state machine 210 advances to the Ready State 330 and un-inhibits any required AFS maneuvers at the AFS 290.

Figure 6:
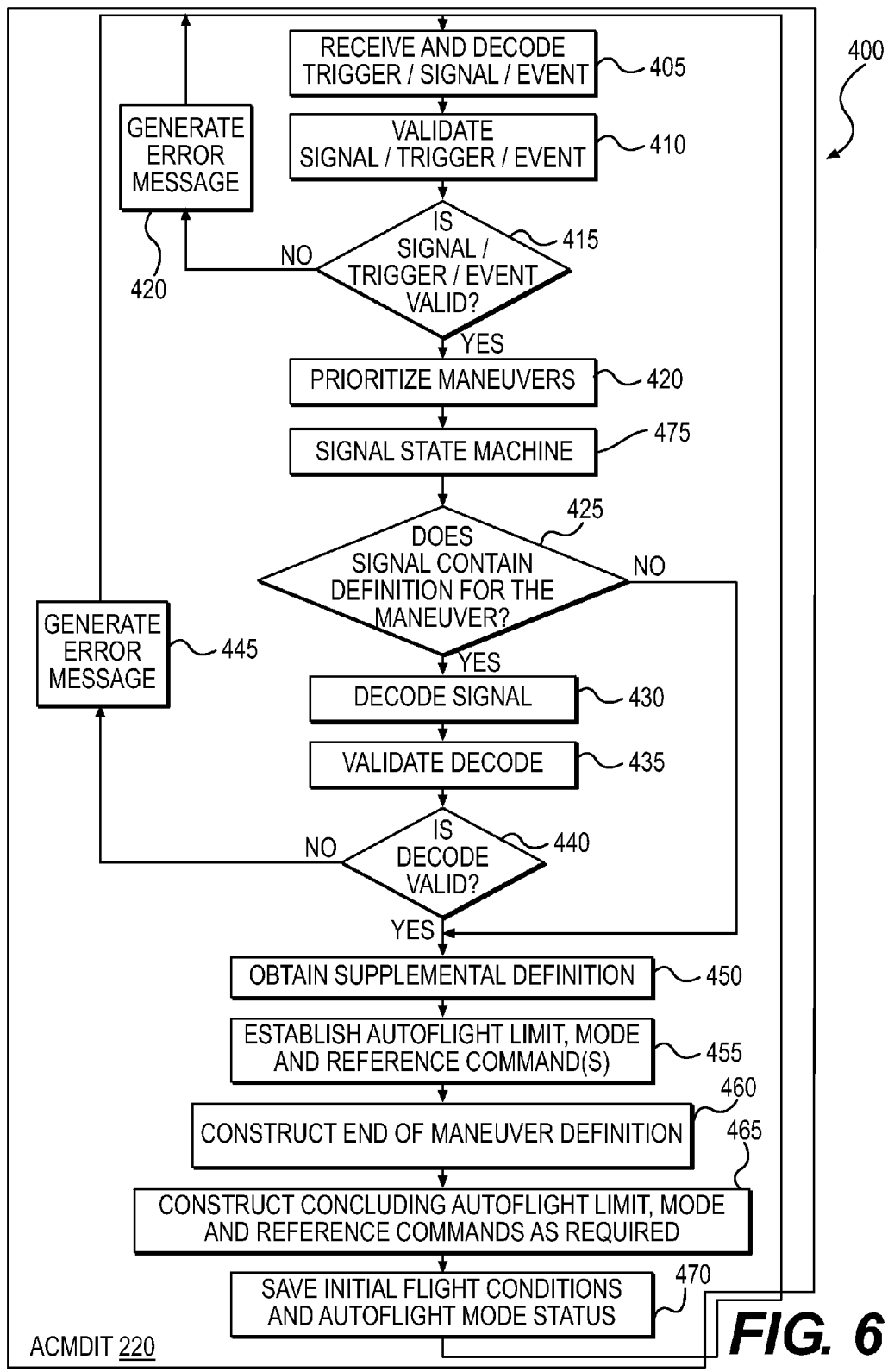
FIG. 6 is a logic flow diagram illustrating an exemplary method executed by the ACMDIT module.

At Ready State 330, the ACMDIT 220 is executing and the state machine 210 waits for a validated and prioritized AMT to be transmitted from the ACMDIT 220 (See FIG. 6). While waiting, the status of all AFS maneuvers may be outputted and rendered on a display device (122/126/132) to provide situational awareness to the pilot 110 by informing the pilot which AFS maneuvers are inhibited within the AMF 200 and which are not inhibited and may therefore become active upon detection of an alert. When received, the state machine 210 activates the highest priority automated maneuver during state machine transition T2 to the Maneuver in Progress State 340.

When one or more AMTs are received and validated by the ACMDIT 220, the state machine 210 inhibits automated maneuvers that are associated with an AMT of lesser priority than the highest priority AMT that is received at the ACMDIT 220. For example, if a ground impact warning generated by the EGPWS 130 is received as the highest priority AMT at the ACMDIT 220, then any automated maneuvers associated with any collision warnings generated by the TCAS 120 would be inhibited as being of lesser priority based on the priority logic programmed into the ACMDIT 220. Once a valid and prioritized AMT has been received, the state machine 210 proceeds to the next state.

At the Maneuver in Progress State 340, the state machine 210 activates the AMATCHIT 270. Because Emergency System alerts are rare, the AMACHIT 270 is normally idle until the state machine 210 activates it. Simultaneously with the activation of the AMATCHIT 270, a message may be rendered on the pilot's display (122/126/132) indicating which automatic maneuver is in progress. The AMATCHIT 270 then begins to execute the maneuver independently of the state machine 210.

When AMATCHIT 270 completes the automated maneuver or detects an end-of-maneuver condition per the maneuver definition constructed by the ACMDIT at process 460 (See, FIG. 6), the AMATCHIT 270 signals the state machine to transition to the Maneuver Exit State 350. A maneuver definition is information or data that specifies modifications to the aircraft longitudinal, lateral, and vertical axes of motion and/or the aircraft state that are required to create a desired trajectory or flight path.

Exemplary end-of-maneuver conditions that could cause the current automated maneuver to end include the removal of the Emergency System alert, an indication from the Emergency System 100 occurs such as a TCAS "Clear of Conflict", a timeout occurs, a guard or limit for the maneuver has been reached such as an altitude deviation limit, a failure is detected in the Emergency System, or a loss of communications with the Emergency System.

While in the Maneuver in Progress State 340, a new indication may be received indicating that a higher priority AMT has been processed by the ACMDIT 220. If an AMT is received that is of a higher priority than the maneuver being executed, the ACMDIT 220 generates an output while in the Maneuver in Progress State 340 that instructs the AMATCHIT 270 to abort the maneuver being executed while remaining within the references and limitations of that maneuver. The State Machine 210 then initiates an AFS maneuver conclusion associated with the current alert by transitioning to Maneuver Exit State 350.

At Maneuver Exit State 350, the executed maneuver is concluded by the AMATCHIT 270 and the maneuver message previously rendered to the pilot is cleared. Exemplary actions taken to conclude a maneuver include restoring the original AFS performance limits, setting an altitude reference and activating an altitude capture mode, arming an FMS mode that had been armed prior to the execution of the automated maneuver or setting a flag or indication that may eventually trigger another automated maneuver.

In addition, the ACMDIT 220 is checked by the state machine 210 to determine if a new valid and prioritized alert that caused the previous maneuver to be aborted had been processed. If so, during transition T4, the state machine activates the higher priority automated maneuver and lower priority automated maneuvers are inhibited. If not, the AMATCHIT 270 is deactivated if no additional priority alert is received.

If one or more valid, higher priority alert is received from the ACMDIT 220, the state machine 210, initiates a new maneuver associated with the highest priority alert received by transitioning back to the Maneuver in Progress State 340. Depending on the number of pending alerts, the state machine 210 may alternate between the Maneuver in Progress State 340 and the Maneuver Exit State 350 as long as there are unresolved AMTs of progressively higher priority waiting in queue at the ACMDIT 220.

If no other valid AMTs have been triggered and processed by the ACMDIT 220 during the Maneuver in Progress State 340, then the state machine 210 proceeds to the Ready State 330. When, the state machine 210 returns to the Ready State 330 any automated maneuvers that were inhibited after leaving the Ready State 330 are un-inhibited.

If lower priority AMTs have been triggered during the Maneuver in Progress State 340, the state machine 210 proceeds to the Inhibit Active Maneuvers State 320. At Inhibit Active Maneuvers state 320, the state machine inhibits all automated maneuvers and waits until all automated maneuver triggers (AMT) (i.e. alerts) are cleared.

FIG. 6 is an exemplary logic flow diagram illustrating the method 400 executed by the ACMDIT module 220 of the AMF 200. At process 405, the ACMDIT 220 receives and decodes an AMT received from an Emergency System 100. Non-limiting examples of an AMT may include a simple alarm enunciation or may be a more sophisticated TCAS RA message embedded with aircraft maneuvering instructions.

At process 410, any received AMTs are validated. Exemplary AMT validation methods can include checking the inhibit status for the automated maneuver to insure that the associated automated maneuver has not been inhibited or checking a monitor that validates proper operation of the Emergency System. For example, a monitor for the EGPWS might verify that the aircraft is at an altitude appropriate for terrain avoidance warnings (e.g. below 20,000 feet) or a monitor for the TCAS RA might verify that the TCAS is in the proper TA/RA mode.

At decision point 415, if the AMT is not valid then an error message is generated at process 420. If the AMT is valid then the AMT is included in a queue of received AMTs and prioritized within that queue at process 420. The AMT queue may reside in memory device 211 (see FIG. 4) within an aircraft, within the AFS 290, or it may be located elsewhere in communication on a network or otherwise in communication with the bus 201. At process 475, the ACMDIT 220 signals to the state machine 300 that a valid AMT has been prioritized.

At the decision point 425, it is determined whether or not the highest priority AMT contains a definition for an AFS maneuver that is associated with the AMT. Simple alarms generated by EGPWS 130 such as a "pull up" alert, may include only enough information to identify the nature of the AMT. Such a simple alarm does not have a maneuver definition. Contrarily a TCAS RA may comprise a substantial maneuver definition including comprehensive maneuvering instructions.

For example, for a TCAS "climb" RA the maneuver definition may call for an AFS vertical speed (VS) mode to be engaged. The AFS VS mode may direct a vertical maneuver to a vertical speed target equal to the red/green boundary value on the aircraft's vertical speed indicator that is typically provided to the pilot 110 on the RA display 126 during a TCAS RA.

When the AMT does not contain a sufficiently robust maneuver definition to generate an associated maneuver, then the method 400 proceeds to process 450. When the AMT does contain a sufficiently robust maneuver definition for the associated maneuver, then the maneuver definition is decoded and validated as a proper maneuver at processes 430 and 435, respectively. For example, a TCAS RA may comprise an ARINC 429 data word with a 12-bit bit field in the data word that defines an RA thereby allowing over 4096 possible decodes. The bit field may be examined to determine that the bit field contains one of a subset of valid decodes that represent a valid RA in process 435. An example of one possible decoded TCAS RA would be a vertical speed maneuver of 1500 fpm (i.e. a basic Climb Corrective RA). ARINC 429 is one application specific standard for aircraft avionics. The ARINC 429 standard is concerned with a self-clocking, self-synchronizing data bus. ARINC 735A standard defines valid data for the TCAS ARINC 429.

When the maneuver definition is determined to be a valid definition and the definition is properly decoded, the method 400 proceeds from decision point 425 to process 450. Otherwise, an error message is generated in process 445 for display to the pilot 110 and the associated AMT is ignored.

At process 450 a supplemental definition associated with the highest priority AMT is obtained from a memory device 211. The supplemental definition may be recorded in a memory 211 that is co-located with the AFS 290, that may be located on a local network within the aircraft or that may be located on a distributed network outside the aircraft. In some embodiments the supplemental definition may be supplied by an air traffic authority over a data link (not shown), for example.

A "supplemental definition" is defined herein as a list of commands that is executable by the AFS 290 and that amplifies and enhances a corresponding maneuver definition that may be received from an Emergency System 100 as a component of an AMT. The supplemental definition may be manifested as a computer script or other suitable data structure that is compatible with the AFS.

For example, a rudimentary "pull up" AMT may be received by the ACMDIT 220 from EGPWS 130. In order to provide a comprehensive maneuver definition capable of guiding the AFS through an entire maneuver as the pilot would have otherwise performed, a predefined supplementary script file is obtained from the memory device 211 that corresponds to the "pull up" AMT. The supplementary script file provides amplifying definitional information that allows the ACMDIT 220 to produce one or more appropriate AFS mode and reference selections in response to the "pull up" AMT. An AFS mode command is a selected AFS mode and any associated reference/target value that would otherwise have entered into the MCP/GP by the pilot for a tactical maneuver using the autopilot under the same flight conditions.

At process 455, autoflight performance limitations and mode reference values are constructed for each portion of the maneuver definition. The various standard AFS modes required by the maneuver definition are identified. As a non-limiting example, a TCAS "CLIMB" RA specifies a vertical speed (VS) maneuver which is a basic AFS mode. The ACMDIT 220 translates this RA alert to the appropriate AFS commands by calling the associated script file from memory 211. The memory 211 may contain the required additional AFS mode commands and target/references for the vertical control (e.g., modes and target/references that may remain armed during the maneuver), for longitudinal control (e.g., airspeed hold), and also set the required vertical acceleration limit (e.g., 0.25 g performance limit) for the AFS maneuver.

At process 460, the parameters identifying the end of the maneuver are defined so that the AFS 290 and the AMATCHIT 270 will recognize when the maneuver is complete. For example, the end of maneuver definition may be an incremental altitude change or an incremental altitude change in conjunction with a relative heading change, a timeout value, or a fault condition.

At process 465, concluding instructions, and autoflight limits, modes and reference values may be constructed. Concluding autoflight limits, modes and references are those instructions that provide a flight profile to be followed upon the completion of a maneuver, such as commanding the AFS 290 to fly straight and level at the altitude and airspeed achieved at the end of the maneuver. Concluding instructions may also trigger another automated maneuver. For instance, after a TCAS RA maneuver, the concluding instructions can instruct the AMF 200 to flag or trigger a subsequent automated maneuver that will return the aircraft to the initial flight conditions previously maintained prior to the RA event.

At process 470, if the state machine 300 is in the Ready State 330, the ACMDIT 220 saves the flight conditions as initial flight conditions and records the status of each of the AFS modes as the initial mode status. The method 400 then returns to process 405 to wait for the next AMT.

Figure 7:
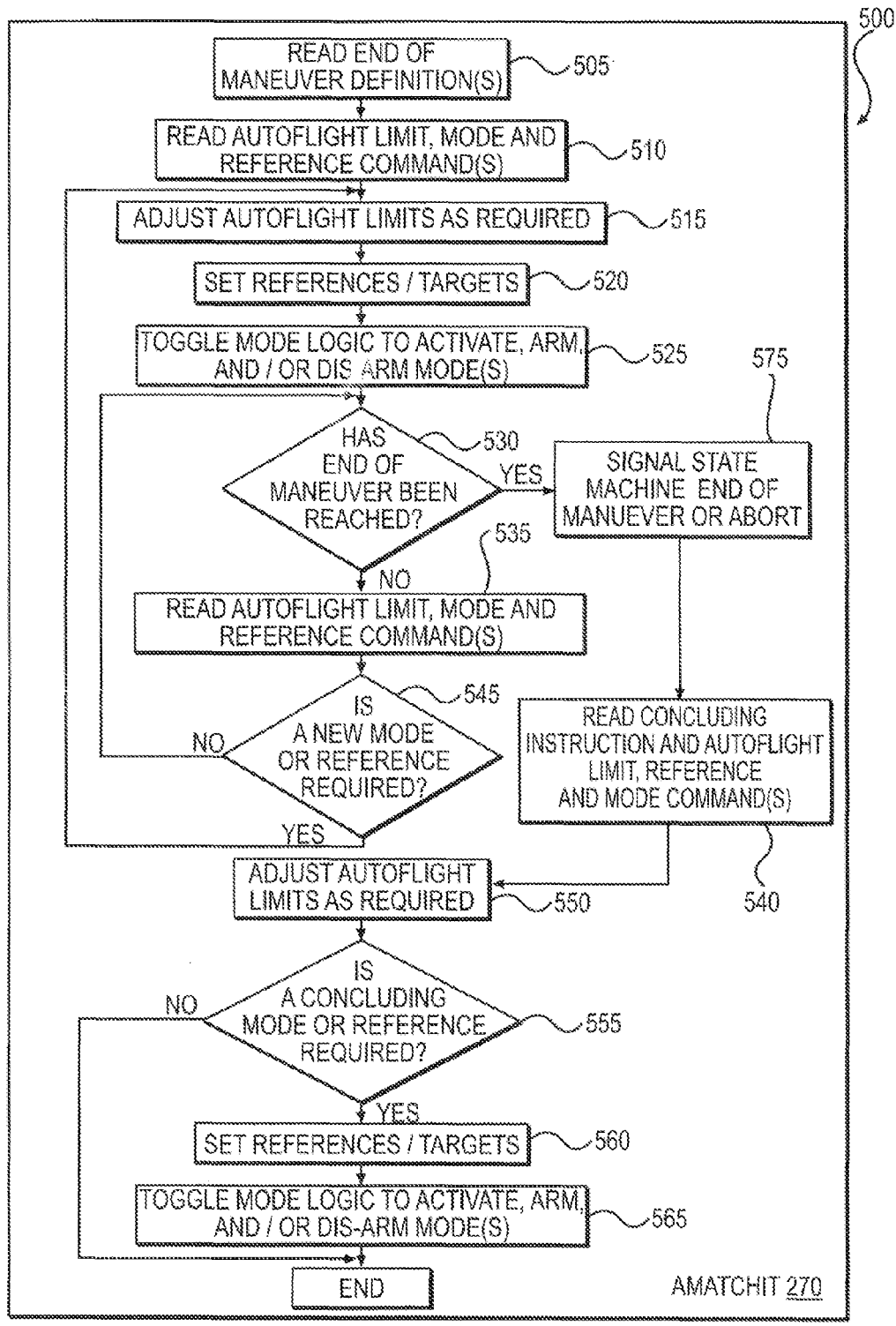
FIG. 7 is a logic flow diagram illustrating an exemplary method executed by the AMATCHIT module.

FIG. 7 is an exemplary logic flow diagram illustrating the method 500 executed by the AMATCHIT 270 of the AMF 200. Because AMTs occur relatively infrequent, the AMACHIT is often idle. When the state machine 210 transitions to the Maneuver in Progress State 340, the method 500 of the AMATCHIT 270 is activated. At process 505, the ACMDIT 220 reads the end of maneuver definition created by the ACMDIT 220 at process 460 and reads the AFS limit, mode and reference commands established at process 455 (see FIG. 6) at process 510.

At process 515, the AMATCHIT 270 adjusts the AFS limits for each of the AFS modes that are required to complete the maneuver and sets the required parameter references and target values in the AFS 290 at process 520.

At process 525, each of the standard AFS modes deployed into the AFS 290 are individually toggled to activate, arm or disarm each one according to the maneuver definition. To accomplish this, the AMATCHIT 270 examines the maneuver definition received from the ACMDIT 220 and determines each standard AFS mode command required to carry out the defined maneuver or the combined parts thereof. The AMATCHIT 270 then activates the required modes in the AFS and deactivates at least some of those that are not required or that may conflict with the maneuver.

At decision point 530, the AMATCHIT 270 checks to see if the end of maneuver definition has been detected. If not, then the AFS 290 is directed to execute the first AFS mode command from the maneuver definition script at process 535.

At decision point 545, the AMATCHIT 270 determines if a new AFS mode or a new reference value for a mode is required. If not, then the process loops between processes 530, 535 and 545 until the end of maneuver definition is detected. If a new mode or a reference point for the current mode is required, the method 500 loops back to process 515.

When an end of maneuver condition has been detected at decision point 530, a signal is sent to the state machine 300 at process 575 to indicate the end of the maneuver and a concluding AFS limit, mode, reference and instruction is read from the maneuver definition script at 540. In process 550, the AFS 290 performance limits are adjusted to the concluding AFS performance limits that were read in process 540.

At process 555, it is determined if a concluding AFS mode or reference is required to be established. If not then the method 500 ends. If so, then the appropriate references and target values for the AFS 290 are set at process 560 according to the definition read at process 540. The AMATCHIT 270 then toggles the various standard AFS modes to activate those that will be required and disarm at least those that would conflict with the conclusion to the maneuver at process 565.

In addition, concluding instructions that may be defined in the maneuver definition script can include the triggering of a new automated maneuver such as a maneuver that returns the aircraft to the previously maintained flight conditions. For instance, after a TCAS RA maneuver, the concluding instructions can instruct the AMF to flag or activate a trigger for a subsequent automated maneuver that will return the aircraft to the initial flight conditions previously maintained prior to the RA event.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for translating one or more alert signals into an auto flight system (AFS) maneuver comprising:
    an emergency system configured to supply one or more alert signals, the emergency system including a traffic collision avoidance system (TCAS) and an enhanced ground proximity warning system (EGPWS);
    a plurality of aircraft flight control actuators;
    an AFS in operable communication with, and configured to control, at least the aircraft flight control actuators; and
    a processor in operable communication with the emergency system to receive the one or more alert signals therefrom, the processor also in operable communication with the AFS, the processor containing a first module, a second module and a state machine and configured to receive a time signal,
    the first module configured to cause the processor to:
    decode the one or more alert signals,
    validate the one or more alert signals,
    determine a maneuver definition that is associated with the one or more alert signals, and
    construct one or more AFS mode commands from the maneuver definition that when executed in combination direct the AFS to perform the AFS maneuver;
    the second module configured to cause the processor to:
    execute the one or more AFS mode commands determined from the maneuver definition by selectively arming one or more standard AFS modes required to implement the AFS maneuver; and
    the state machine coupling the first module to the second module, the state machine configured to cause the processor to coordinate a function of first module with that of the second module based on the time signal,
    wherein the state machine comprises at least an Inhibit Active Maneuvers State, a Ready State, a Maneuver in Progress State, and a Maneuver Exit State.

2. The apparatus of claim 1, wherein the maneuver definition is determined based at least in part on the validation of each of the one or more alert signals.

3. The apparatus of claim 1, further comprising a memory device, wherein the memory device contains, recorded thereon, one or more supplemental maneuver definitions associated with the one or more alert signals.

4. The apparatus of claim 3, wherein the one or more AFS mode commands is determined by combining the maneuver definition and the one or more supplemental maneuver definitions.

5. The system of claim 1, wherein the first module is further configured to cause the processor to prioritize the one or more alert signals based at least in part on the validation of the one or more alert signals.

6. The system of claim 1, wherein the first module is further configured, upon receiving the alert signal, to cause the processor to determine if the alert signal includes an AFS maneuver definition based at least in part on the validation of each of the alert signal.

7. The system of claim 1, wherein the state machine in the Inhibit Active Maneuvers State waits until all previous alert signals have cleared.

8. The system of claim 1, wherein the state machine in the Ready State:

receives a prioritized alert signal from the first module;
activates the first module to process the prioritized alert; and
inhibits any lower priority AFS maneuvers.

9. The system of claim 1, wherein the state machine in the Maneuver in Progress State activates the second module to read the one or more AFS mode commands constructed by the first module.

10. The system of claim 1, wherein the state machine in the Maneuver Exit State:

activates the second module to conclude the AFS maneuver;
receives a prioritized alert signal from the first module;
activates the first module to process the prioritized alert signal; and
inhibits any lower priority active maneuvers based at least on the prioritized alert signal.

* * * * *